R. L. NELSON.

Improvement in Corn-Harvesters.

No. 130,065.  Patented July 30, 1872.

Witnesses.
D. P. Cowl
Edmund Masson

Inventor.
Richard L. Nelson
By atty. A. B. Stoughton.

UNITED STATES PATENT OFFICE.

RICHARD L. NELSON, OF ORANGE COURT-HOUSE, VIRGINIA.

IMPROVEMENT IN CORN-HARVESTERS.

Specification forming part of Letters Patent No. 130,065, dated July 30, 1872.

*To all whom it may concern:*

Be it known that I, RICHARD L. NELSON, of Orange Court-House, in the county of Orange and State of Virginia, have invented certain new and useful Improvements in Corn-Harvesters; and that the following is a full, clear, and exact description of the same, reference being had to the accompanying drawing making a part of this specification, in which—

Figure 1:
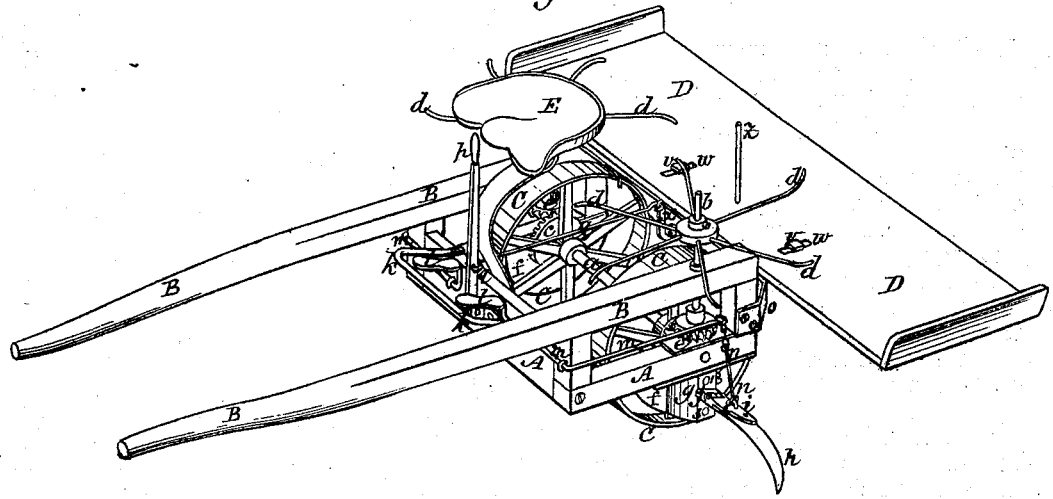
Figure 2:
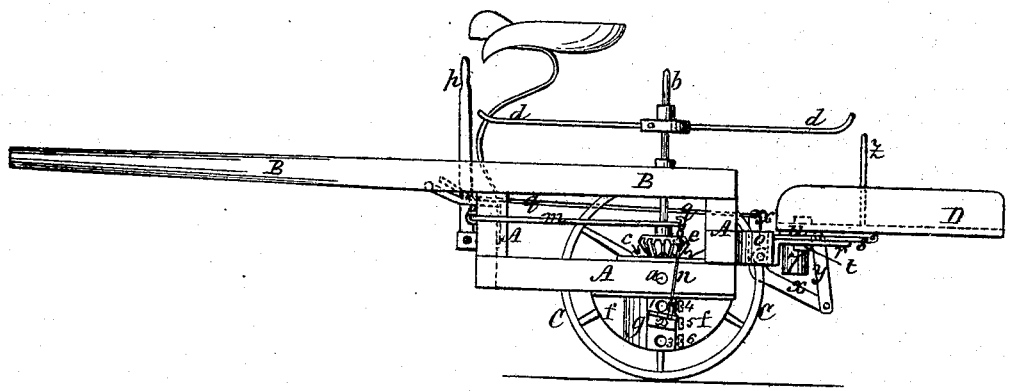

Figure 1 represents a perspective view of the machine. Fig. 2 represents a side elevation of the same.

Similar letters of reference, where they occur in the separate figures, denote like parts of the machine in both.

This invention relates to certain details of a corn-harvesting machine and improvements thereon, which, after much experience and time, I have developed, and which relate, first, to an adjustable self-acting platform or dropper, which, though self-acting, is always under the control of the driver or operator in his seat and riding upon the machine; second, to the particular manner of hinging and hanging the cutters or knives, so that they will under ordinary circumstances accommodate themselves to their work and yield to certain obstructions in their way, but always be under the control of the driver in his seat; third, to a single mechanism or device which accomplishes three purposes or objects, viz., a cog-wheel shield, a knife-holder, and a guard for preventing too much oscillation of the machine as it passes over the field.

To enable others skilled in the art to make and use my invention, I will proceed to describe the same with reference to the drawing.

The main frame A is suspended to the thills B, so as to bring the working part of the machine quite close to the ground. The carrying and driving wheels C are made fast upon their axle $a$, so that they shall turn with it, said driving-wheels being within the outer sides of the main frame. Upon the outer sides of the carrying and driving wheels C are arranged bevel-gear wheels $c$, which mesh with and turn the bevel-gears $e$ on the vertical reel-shafts $b$, on the top or near the top of which shafts are adjustably fixed the reels $d$, which gather and draw in the stalks within the range of the knives, where they are cut off, and the reel-arms, still holding said severed stalks, deposit them upon the platform or table D, whence, after a sufficient quantity has accumulated, they are dumped upon the ground in rear of the machine. Underneath the main-frame side pieces are arranged flanged plates $f$, which carry the knife-holders $g$, and which also serve as shields to the bevel-wheels $c$, and the said plates and the knife-holders, one or both, aid in preventing the machine from rocking laterally, as it is apt to do when moving over the rough or furrowed ground. The knife-holders $g$ are projections upon the plates $f$, and extend further out beyond the point of lateral oscillation than the plates do, and will come in contact with the ground and check such lateral swaying. The knives or blades $h$ are of curved or sickle form, and are fastened to knife-stocks $i$, which in turn are hinged by a rule-joint hinge to a shank-piece, $j$, which can be set and fastened in any of the series of holes 1 2 3 in the knife-holder $g$, and fastened therein by a set-screw, as shown at 4 5 6, and at any such angle as it may be desired that the knife should be set at. At the foot-rest $k$, where the driver braces himself in his seat E, are foot-levers $l$, which, through rods $m$ and links $n$, are connected respectively to the knife-stocks $i$ on each side of the machine, so that the driver in his seat may at any time raise up one or both of the knives when any obstruction comes in their path, and when the obstruction is passed he may let them down again at pleasure. When the under sides of the knives come against any smaller obstructions, such as the driver does not or need not notice, they will rise upon their hinged connections, and when the obstruction has been passed they will drop down again into working position. To a bar, $o$, at the rear of the main frame, are attached brackets $r$, upon the top of which rest the hinge-plates $s$, and to or on which said hinge-plates may be moved front or rear, and there fastened by set-screws $t$, that pass through slots in said brackets. To the other hinge-plates or ears $u$ the platform or table D is made adjustable and fastened by set-screws $v$ passing through slots $w$ in the platform or table, so that there are two adjustments, by which the table or platform may be set forward or back to make it balance and be self-acting, as will be explained. Underneath the platform or table, and at its front part, is a weight or counterpoise, 7, for bringing the platform or table back to a horizontal, or nearly so, position after it has been dumped by the weight of and delivered the accumulated load of stalks upon the ground. At the front of the main frame there is pivoted a lever, *p*, which extends upward into convenient position to be caught and operated by the driver on his seat E. To this lever is connected one end of a rod, *q*, the other end of which is attached to one arm of a bell-crank lever, *x*, that is pivoted to the rear bar *o*, and the other arm of the bell-crank is connected by a pivot to a vertical bar or link, *y*, pivoted to the under side of the table or platform, so that while the table or platform is self-dumping under a certain quantity or weight of stalks the driver may retard or accelerate the dumping, as may be necessary, and more particularly in going down or up an acclivity. As a further means of operating or righting up the platform, should the counter or overpoise fail to do it, a post, *z*, is set in the platform or table, which the operator may seize, and draw it into proper position.

Having thus fully described my invention, what I claim is—

1. In combination with the hinged and dumping platform D and the brackets *r* for supporting it, the interposed hinge, upon the upper leaf of which the platform is adjustable, and the under leaf *s* thereof adjustable on said brackets, so that the platform may set forward or back to receive and be made adjustable to dump under a fixed load of stalks, substantially as described.

2. I also claim the combination of the knife-holder *g*, the shank-piece *j*, and knife-stock *i*, when the shank-piece and knife-stock are connected by a rule-joint hinge and both capable of being set up or down or in an angular position in the knife-holder, substantially as described.

3. I also claim the knife-holder *g*, supported by the shield-plate *f*, and constructed to serve as a shoe, to prevent undue lateral rocking of the machine, substantially as described.

RICHARD L. NELSON.

Witnesses:
A. B. STOUGHTON,
EDMUND MASSON.